(12) United States Patent
Nemet et al.

(10) Patent No.: US 8,175,786 B2
(45) Date of Patent: May 8, 2012

(54) METHOD FOR OPERATING A GAS TURBINE AND ALSO GAS TURBINE FOR CARRYING OUT THE METHOD

(75) Inventors: Anton Nemet, Nussbaumen (CH);
Xiao-Yi Zhang, Niederrohrdorf (CH)

(73) Assignee: Alstom Technology Ltd, Baden (CH)

( * ) Notice: Subject to any disclaimer, the term of this patent is extended or adjusted under 35 U.S.C. 154(b) by 546 days.

(21) Appl. No.: 12/342,847

(22) Filed: Dec. 23, 2008

(65) Prior Publication Data
US 2009/0138170 A1 May 28, 2009

Related U.S. Application Data

(63) Continuation of application No. PCT/EP2007/055813, filed on Jun. 13, 2007.

(30) Foreign Application Priority Data

Jul. 6, 2006 (CH) ........................................ 1087/06

(51) Int. Cl.
*F02C 3/00* (2006.01)
(52) U.S. Cl. ........................................ 701/100; 415/116
(58) Field of Classification Search .................. 701/100; 60/39.281, 39.282, 39.182, 39.53; 415/116, 415/117, 144, 145
See application file for complete search history.

(56) References Cited

U.S. PATENT DOCUMENTS

| | | | |
|---|---|---|---|
| 5,454,220 A | 10/1995 | Althaus et al. | |
| 6,216,437 B1 | 4/2001 | Hepner et al. | |
| 6,216,443 B1 * | 4/2001 | Utamura | 60/39.53 |
| 6,598,401 B1 * | 7/2003 | Utamura | 60/775 |
| 7,404,287 B2 * | 7/2008 | Utamura | 60/39.53 |
| 2005/0131616 A1 | 6/2005 | Fujii | |

FOREIGN PATENT DOCUMENTS

| | | |
|---|---|---|
| EP | 0620362 B1 | 2/1999 |
| EP | 0903469 A1 | 3/1999 |

\* cited by examiner

*Primary Examiner* — Dalena Tran
(74) *Attorney, Agent, or Firm* — Volpe and Koenig, P.C.

(57) ABSTRACT

A method is provided for operating a gas turbine, which especially feeds power to a local isolated power supply network, and which comprises a compressor for compressing combustion air which is drawn in from the environment, a combustion chamber for combusting supplied fuel by the compressed combustion air, a turbine which is driven by the hot gas from the combustion chamber, and a generator, which is driven by the turbine, for generating electric power. With such a method, an improvement of controlling is achieved by one or more parameters of the gas turbine being measured or determined, by the effective thermal output power of the gas turbine being calculated from the measured or determined parameters, and by the calculated effective thermal output power being used for controlling the gas turbine.

17 Claims, 1 Drawing Sheet

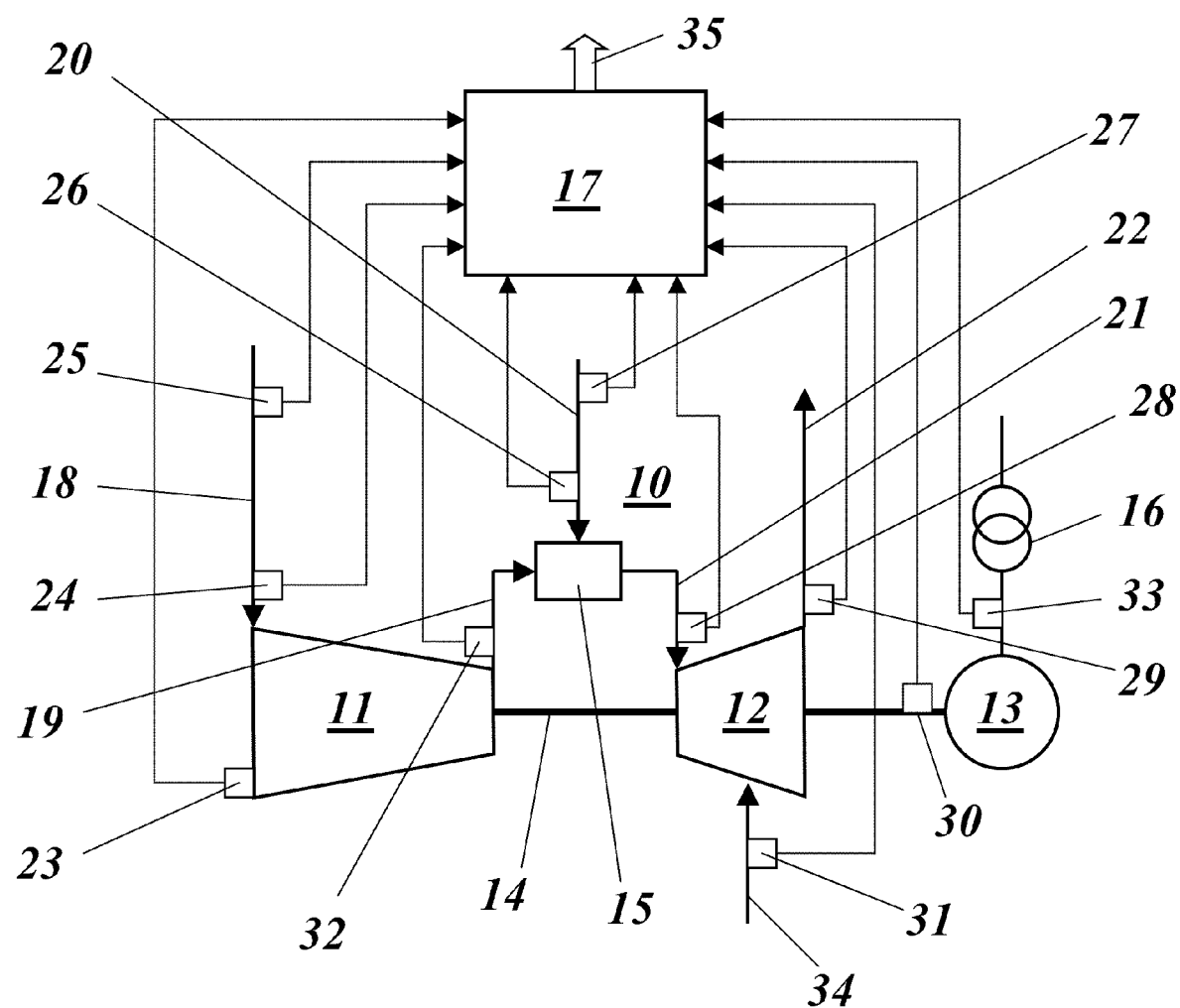

METHOD FOR OPERATING A GAS TURBINE AND ALSO GAS TURBINE FOR CARRYING OUT THE METHOD

CROSS REFERENCE TO RELATED APPLICATIONS

This application is a continuation of International Application No. PCT/EP2007/055813 filed Jun. 13, 2007, which claims priority to Swiss Patent Application No. 01087/06, filed Jul. 6, 2006 the contents of both of which are incorporated by reference as if fully set forth.

FIELD OF INVENTION

The present invention refers to the field of technology of gas turbine installations. It relates to a method for operating a gas turbine and to a gas turbine for carrying out the method.

BACKGROUND

A gas turbine installation for generating electric power customarily comprises a compressor which draws in air from the environment via a compressor inlet 18, compresses this, and delivers the compressed air via a compressor outlet to a subsequent combustion chamber where it is used for combusting a liquid or gaseous fuel which is introduced through a fuel feed line. The hot gas which results during the combustion is transmitted via a turbine inlet to a turbine which is connected downstream, where it is expanded, performing work. The expanded gas is discharged as exhaust gas at a turbine exhaust. Via a common shaft, the turbine drives both the compressor and a generator, at the terminals of which electric power can be tapped and transmitted via a transformer to a local or national power supply network.

The output power of the gas turbine installation at the generator terminals is one of the main control parameters of the power plant. If the gas turbine is part of a so-called "power island" (note: an isolated local network, which is separated from the national grid, with limited electrical capacity is to be understood by "power island" in this connection; typical examples of power islands are metallurgical plants, paper mills or rolling plants), the controlling of the gas turbine and its precise and reliable operation takes place in an environment which is characterized by a continuous power demand of the individual, often fluctuating consumers on the power island. In such a complex environment, the controlling of the gas turbine requires particular attention.

While the efficient and accurate controlling of a gas turbine installation in a generally "rigid" national grid already represents a challenge, the requirements increase if a comparatively smaller isolated local network with individual consumers and associated critical processes is to be operated and kept alive.

The controlling of the gas turbine installation especially requires improved and further developed control strategies for modern gas turbine installations during faster transition phases with potential network frequency fluctuations.

A special demand upon gas turbine controlling in isolated power islands with potential network frequency fluctuations results from the fact that the active power at the generator terminals ($P_{GENO}$) comprises a kinetic power ($P_{KINETIC}$) in addition to the thermal power ($P_{GT}$) of the gas turbine, which kinetic power is proportional both to the time derivative of the network frequency (dn/dt) and to the total inertia moment ($J_{ISLAND}$) of the consumers which are connected up to the island during such an event.

A device for calculating the mechanical output power of a gas turbine is known from publication US-A1-2005/0131616, in which by the use of a wattmeter and a tachometer the electric power at the generator terminals and the speed of the turbine are measured, and from the two values the mechanical output power of the turbine is calculated by an equation. This solution is dependent upon measuring at the generator terminals and therefore cannot be applied in cases in which this measuring cannot be carried out, is not quick enough, or is falsified by interruptions. This is especially the case with the aforementioned power islands.

A method for controlling the power of a turbogroup is known from EP-A1-0 903 469, in which the power which is delivered by the generator is determined and the thermal power of the turbine is controlled in dependence upon the measured electric power of the generator, wherein the kinetic power which is absorbed or delivered by the shaft is additionally determined and the thermal power is controlled in accordance with the sum of the electric power and kinetic power. The electric power in this case can especially be calculated from the rotational frequency of the shaft and the torque acting on the shaft. This solution is not suitable for power islands either.

SUMMARY

The present disclosure is directed to a method for operating a gas turbine that feeds power to a local isolated power supply network. The turbine includes a compressor, for compressing combustion air which is drawn in from the environment, and a combustion chamber for combusting supplied fuel using the compressed combustion air. The gas turbine also includes a turbine which is driven by hot gas from the combustion chamber, and a generator, which is driven by the turbine, for generating electric power. The method includes measuring or determining at least one of the following parameters of the gas turbine: an ambient temperature, a compressor inlet temperature, a compressor outlet temperature, a turbine exhaust temperature, an ambient air pressure, a total or static absolute or gauge pressure at a compressor outlet, a total or static absolute or gauge pressure at a turbine inlet, a pressure loss between compressor outlet and turbine inlet, a speed of the gas turbine or a frequency of a power supply network, a measured or predetermined mass flow of the fuel which is fed to the combustion chamber, and a lower heating value of the fuel. The method also includes calculating an effective thermal output power of the gas turbine from the measured or determined parameters; and controlling the gas turbine based on the calculated effective thermal output power.

The present disclosure is also directed to a gas turbine including a compressor for compressing combustion air which is drawn in from the environment, a combustion chamber for combusting supplied fuel by the compressed combustion air, a turbine which is driven by the hot gas from the combustion chamber and a generator, which is driven by the turbine, for generating electric power which is fed to a local isolated power supply network. A control unit is provided for controlling the operation of the gas turbine, and at associated points of the gas turbine transducers are provided for measuring at least one of the following parameters: an ambient temperature, a compressor inlet temperature, a compressor outlet temperature, a turbine exhaust temperature, an ambient air pressure, a total or static absolute or gauge pressure at a compressor outlet, a total or static absolute or gauge pressure at a turbine inlet, a pressure loss between compressor outlet and turbine inlet, a speed of the gas turbine or a frequency of the power supply network, a measured or predetermined mass flow of the fuel which is fed to the combustion chamber, and a lower heating value of the fuel. The transducers are connected to the control unit, and the control unit is configured to calculate the effective thermal output power of the gas turbine from the data which is generated by the transducers.

BRIEF DESCRIPTION OF THE DRAWING

The invention is to be subsequently explained in more detail based on exemplary embodiments in conjunction with the drawing. The single FIGURE shows a connection diagram of a gas turbine with a control unit according to a preferred exemplary embodiment of the invention.

DETAILED DESCRIPTION OF THE PREFERRED EMBODIMENTS

Introduction to the Embodiments

It is the object of the invention to disclose a method for operating a gas turbine, and also a gas turbine for carrying out the method, which avoid the disadvantages of known solutions and which are especially suitable for installations which are used in power islands.

The object is achieved as set forth below. It is essential for the invention that one or more of the following parameters of the gas turbine, specifically
  the ambient temperature,
  the compressor inlet temperature,
  the compressor outlet temperature,
  the turbine exhaust temperature,
  the ambient air pressure,
  the total or static absolute or gauge pressure at the compressor outlet,
  the total or static absolute or gauge pressure at the turbine inlet
  the pressure loss between compressor outlet and turbine inlet,
  the speed of the gas turbine or the frequency of the power supply network,
  the measured or predetermined mass flow of the fuel which is fed to the combustion chamber, and
  the lower heating value of the fuel,
are measured or determined, that from the measured or determined parameters the effective thermal output power of the gas turbine is calculated, and that the calculated effective thermal output power is used for controlling the gas turbine.

According to one embodiment of the invention, the compressor comprises variable inlet guide vanes and the position of the variable inlet guide vanes is taken into consideration as a further parameter when calculating the effective thermal output power.

In another embodiment of the invention a cooling medium, especially water or steam, is fed to the gas turbine at a chosen point, and in that the mass flow of the cooling medium is taken into consideration as a further parameter when calculating the effective thermal output power.

In a preferred embodiment of the invention, the effective thermal output power of the gas turbine is calculated in accordance with the equation $$P_{GT} \alpha f1(p_3) \cdot f2(m_{fuel}) \cdot f3(LHV) \cdot f4(n_{GT}) \cdot f5(T_2)$$

wherein $f1, \ldots, f5$ are functions which are to be determined for the respective case, $p_3$ is the compressor outlet pressure, $m_{fuel}$ is the fuel mass flow, LHV is the lower heating value of the fuel, $n_{GT}$ is the speed of the gas turbine, and $T_2$ is the compressor inlet temperature.

In this case, the ambient temperature can especially be used as a variable in the equation instead of the compressor inlet temperature as long as available devices for cooling or for preheating the ambient air which is drawn in by the compressor are not activated.

In a preferred embodiment, in order to take into consideration ageing effects and other changes in the gas turbine, the effective thermal output power of the gas turbine is measured at determined time points. The coefficients which occur in the equation are adjusted by comparison with the calculated effective thermal output power. Furthermore, the lower heating value of the fuel in the equation can also be adjusted from time to time.

In a further embodiment of the invention, the effective thermal output power of the gas turbine is continuously measured, in that for the controlling of the gas turbine the measured or calculated value of the effective thermal output power is selectively used, and in that the controlling of the gas turbine is automatically changed over from one to the other value depending upon the state of the gas turbine and of the power supply network.

The measured value of the effective thermal output power can especially be used in this case for controlling the gas turbine if the gas turbine is in a steady operating state, and the calculated value of the effective thermal output power is used if the gas turbine is in a fast changing transition state and/or the power supply network is unstable.

In another embodiment of the gas turbine according to the invention, the compressor comprises variable inlet guide vanes, and transducer, which is connected to the control unit, is arranged on the compressor for sensing the position of the variable inlet guide vanes.

In another embodiment, devices for cooling the gas turbine by a cooling medium are provided on the gas turbine, and in that a transducer, which is connected to the control unit, is arranged on the gas turbine for measuring the mass flow of the cooling medium.

According to a further embodiment of the invention, devices, which are connected to the control unit, are attached on the terminals of the generator for measuring the power which is delivered at the generator terminals.

In this case the invention is not limited to a gas turbine according to the description and FIGURE which follow here, but it also covers gas turbines with a sequential firing, as originates from EP-0620362-B1. This whole publication in this case forms an integral part of this application.

DETAILED DESCRIPTION

The invention is based on the fact that, as already mentioned above, the active power at the generator terminals ($P_{GENO}$) comprises a kinetic power ($P_{KINETIC}$) in addition to the thermal power ($P_{GT}$) of the gas turbine, which kinetic power is proportional both to the time derivative of the network frequency (dn/dt) and to the total inertia moment ($J_{ISLAND}$) of the consumers which are connected up to the island during such an event.

Since the inertia moment is to be predicted only with difficulty due to the practically unlimited combination possibilities of the individual consumers, it is simpler to determine the effective thermal power ($P_{GT}$) by suitable physical/mathematical methods as input values for the control system of the gas turbine.

The physical formulation for the description of the aforementioned transient effects uses the following equation:

$$P_{GENO} = P_{GT} + P_{KINETIC} = P_{GT} + 4\pi^2 \cdot J_{ISLAND} \cdot n \cdot \left(\frac{dn}{dt}\right) \quad (1)$$

wherein the equation for the steady state can be simplified to $$P_{GENO} = P_{GT} \quad (2)$$

The proposed method is based on the determining of the effective thermal output power of the gas turbine by various measured characteristic parameters. Taking into consideration the thermodynamics of an open gas turbine cyclic process (Joule-Brayton cyclic process), the thermal output power of a gas turbine in simple values follows the relationship $$P_{GT} \alpha m_{exh} \cdot (h_6 - h_7), \quad (3)$$

wherein the indices "6" and "7" refer to the conditions at the turbine inlet (21) and turbine exhaust (22).

In the case of an idealized uncooled turbine, the value $m_{exh}$ represents the total exhaust gas flow which passes through the turbine (12), while the inlet enthalpy $h_6$ is linked with the turbine inlet temperature (TIT) according to international standard ISO 2314:1989.

If a constructed gas turbine with a prespecified swallowing capacity and a defined operating concept is taken as a starting point, the operating range of the gas turbine is consequently established, and the thermal output power of the gas turbine can be approximated by a mathematical function of the following type:

$$P_{GT} \alpha f1(p_3) \cdot f2(m_{fuel}). \quad (4)$$

The compressor outlet pressure $p_3$ in the equation (4) is directly linked with the exhaust gas mass flow $m_{exh}$, while the fuel mass flow $m_{fuel}$ represents a suitable measurement for the firing degree of the gas turbine, i.e. for the inlet enthalpy $h_6$ from equation (3).

In order to compensate for possible fluctuations in the lower heating value (LHV) of the fuel, the equation (4) can be expanded as follows:

$$P_{GT} \alpha f1(p_3) \cdot f2(m_{fuel}) \cdot f3(LHV). \quad (5)$$

If, furthermore, fluctuations are to be compensated for in the network frequency (which are equivalent to the relative change in the rotor speed of the gas turbine), and changes in the ambient temperature are to be taken into consideration, the following equation finally results from the equation (5):

$$P_{GT} \alpha f1(p_3) \cdot f2(m_{fuel}) \cdot f3(LHV) \cdot f4(n_{GT}) \cdot f5(T_1). \quad (6)$$

If the ambient temperature $T_1$ is substituted by the compressor inlet temperature $T_2$, there finally follows:

$$P_{GT} \alpha f1(p_3) \cdot f2(m_{fuel}) \cdot f3(LHV) \cdot f4(n_{GT}) \cdot f5(T_2). \quad (7)$$

The last-mentioned equation (7) can be referred to as a so-called "power formula".

The most suitable structure of the functions f1, . . . , f5 in equation (7) follows from the specific operating characteristic of the respective gas turbine and must be determined individually on the basis either of suitable calculations of the cyclic process or from direct measurements on the gas turbine.

If the functions f1, . . . , f5 of the equation (7) are defined in a suitable manner, the correlation for the effective thermal power according to equation (6) or (7) can be integrated in a simple manner into the control system of the gas turbine, in which the following parameters are measured individually or in combination and processed in the control unit of the gas turbine:

- the ambient temperature $T_1$,
- the compressor inlet temperature $T_2$,
- the compressor outlet temperature
- the turbine exhaust temperature
- the ambient air pressure
- the total or static absolute or gauge pressure $p_3$ at the compressor outlet 19,
- the total or static absolute or gauge pressure at the turbine inlet 21,
- the pressure loss between compressor outlet 19 and turbine inlet 21,
- the speed $n_{GT}$ of the gas turbine 10 or the frequency of the power supply network,
- the position of the variable inlet guide vanes VIGV of the compressor 11,
- the measured or predetermined mass flow $m_{fuel}$ of the fuel which is fed to the combustion chamber 15,
- the measured or predetermined mass flow of the water or steam if either of these is additionally injected into a component of the gas turbine; and
- the lower heating value (LHV) of the fuel on the basis of for example an online gas chromatograph (GC).

In order to provide corresponding parameter values for the control unit 17, according to the FIGURE various transducers 23, . . . , 32 are provided in a distributed manner in the gas turbine 10 and are connected to the control unit 17:

- the transducer 23 is provided for the position of the variable inlet guide vanes VIGV of the compressor 11;
- the transducers 24 at the compressor inlet 18 are provided for the pressure and/or for the temperature at the compressor inlet 18;
- the transducer 25 is provided for the ambient temperature $T_1$ and/or for the ambient air pressure;
- the transducer 26 on the fuel feed line 20 measures the fuel mass flow $m_{fuel}$;
- the transducer 27 on the fuel feed line 20 for example is formed as a gas chromatograph and measures the lower heating value LHV of the fuel;
- the transducer 28 which is arranged at the turbine inlet 21 measures the turbine inlet pressure;
- the transducer 29 which is arranged at the turbine exhaust 22 is provided for measuring the turbine exhaust temperature;
- the transducer 30 which is arranged on the shaft 14 senses the speed of the shaft 14;
- the transducer 31 which is arranged on the cooling medium feed line 34 measures the mass flow of the cooling medium;
- the transducer 32 which is provided at the compressor outlet 19 measures the compressor outlet temperature and the compressor outlet pressure; and
- the transducer which is arranged on the generator terminals measures the electric power at the generator terminals.

From the incoming measured values the control unit calculates the effective thermal power of the gas turbine 10 in accordance with the equations (6) or (7), and from it derives control signals which are delivered at the output 35 of the control unit for controlling the gas turbine 10 in a manner known per se.

It can be advantageous within the scope of the invention if the "power formula" according to equation (6) or (7) is adapted continuously (online adaptation) to permanent or temporary changes in the gas turbine 10. Thus, it is difficult to incorporate ageing effects and the thermal state of the gas turbine into the "power formula" from the outset. The calculated power, therefore, will not be exactly the same as the power which is measured by the transducer 33. In this case, assistance can be created by the coefficients of the "power formula" being automatically altered online in order to correlate the measured power with the calculated power.

In case the lower heating value LHV of the fuel is not measured online by a gas chromatograph, or the delay time of the gas chromatograph is too long, it is practical to correspondingly adjust the lower heating value LHV in the "power formula".

If the gas turbine 10 is in a steady state or stable state, the power which is measured at the generator terminals is of higher accuracy. If, on the other hand, the gas turbine 10 is in a fast changing transient operating state, or if the network is unstable, the inaccuracy of the measured power is great. This inaccuracy can have the following causes:

the lacking dynamics of the power measuring (i.e. the measuring is not quick enough);
and/or the kinetic power of the power train.

In these cases, the calculated power can be used for controlling the gas turbine 10 instead of the measured power. An automatic switching can be provided in the control unit 17 so as to use the suitable power value (measured or calculated) in accordance with the operating state of the gas turbine 10 and of the network.

The described method can not only be advantageously used in power islands but can generally be used in the following situations:

1. The active power of the gas turbine cannot be directly measured at the generator terminals ($P_{GENO}$). This is especially the case with
   a. a gas turbine operation for supporting a power island, i.e. especially during fast transient operating states and/or network fluctuations;
   b. gas turbine operation in a combined cycle power plant with a single-shaft configuration.
2. The measuring of the active power at the generator terminals ($P_{GENO}$) is not quick enough.
3. The measuring of the active power at the generator terminals ($P_{GENO}$) is interrupted.

In all, a gas turbine operation is created with the invention in which the controlling both in the steady state and in transient operating states is improved and the availability and reliability especially of the critical local isolated networks ("power islands") is increased.

| List of designations | |
|---|---|
| 10 | Gas turbine |
| 11 | Compressor |
| 12 | Turbine |
| 13 | Generator |
| 14 | Shaft |
| 15 | Combustion chamber |
| 16 | Transformer |
| 17 | Control unit |
| 18 | Compressor inlet |
| 19 | Compressor outlet |
| 20 | Fuel feed line |
| 21 | Turbine inlet |
| 22 | Turbine exhaust |
| 23, . . . , 33 | Transducer |
| 34 | Cooling medium feed line |
| 35 | Control output |

What is claimed is:

1. A method for operating a gas turbine (10), which feeds power to a local isolated power supply network, and which comprises a compressor (11) for compressing combustion air which is drawn in from the environment, a combustion chamber (15) for combusting supplied fuel using the compressed combustion air, a turbine (12) which is driven by hot gas from the combustion chamber (15), and a generator (13), which is driven by the turbine (12), for generating electric power, the method comprising:

providing at least one transducer (23, . . . ,33) for measuring or determining at least one of the following parameters of the gas turbine:
an ambient temperature ($T_1$),
a compressor inlet temperature ($T_2$),
a compressor outlet temperature
a turbine exhaust temperature
an ambient air pressure
a total or static absolute or gauge pressure ($p_3$) at a compressor outlet (19),
a total or static absolute or gauge pressure at a turbine inlet (21),
a pressure loss between compressor outlet (19) and turbine inlet (21),
a speed ($n_{GT}$) of the gas turbine (10) or a frequency of a power supply network,
a measured or predetermined mass flow ($m_{fuel}$) of the fuel which is fed to the combustion chamber (15), and
a lower heating value (LHV) of the fuel;
calculating an effective thermal output power ($P_{GT}$) of the gas turbine (10) from the measured or determined parameters; and
controlling the gas turbine (10) based on the calculated effective thermal output power ($P_{GT}$), wherein the effective thermal output power ($P_{GT}$) of the gas turbine (10) is calculated in accordance with the equation $$P_{GT} \alpha f1(p_3) \cdot f2(m_{fuel}) \cdot f3(LHV) \cdot f4(n_{GT}) \cdot f5(T_2)$$

where $f1, \ldots, f5$ are functions which are to be determined for a respective case, $p_3$ is the compressor outlet pressure, $m_{fuel}$ is the fuel mass flow, LHV is the lower heating value of the fuel, $n_{GT}$ is the speed of the gas turbine (10), and $T_2$ is the compressor inlet temperature.

2. The method as claimed in claim 1, wherein the compressor (11) comprises variable inlet guide vanes (VIGV), and a position of the variable inlet guide vanes (VIGV) is taken into consideration as a further parameter when calculating the effective thermal output power ($P_{GT}$).

3. The method as claimed in claim 1, wherein a cooling medium is fed to the gas turbine (10) at a chosen point (34), and the mass flow of the cooling medium is taken into consideration as a further parameter when calculating the effective thermal output power ($P_{GT}$).

4. The method as claimed in claim 1, wherein the ambient temperature ($T_1$) is used as a variable in the equation instead of the compressor inlet temperature ($T_2$).

5. The method as claimed in claim 4, wherein for taking into consideration ageing effects and other changes in the gas turbine (10) the effective thermal output power ($P_{GT}$) of the gas turbine (10) is measured at specific time points, and the coefficients which occur in the equation are adjusted by comparison with the calculated effective thermal output power ($P_{GT}$).

6. The method as claimed in claim 5, wherein the lower heating value (LHV) of the fuel in the equation is adjusted from time to time.

7. The method as claimed in claim 1, wherein for taking into consideration ageing effects and other changes in the gas turbine (10) the effective thermal output power ($P_{GT}$) of the gas turbine (10) is measured at specific time points, and the coefficients which occur in the equation are adjusted by comparison with the calculated effective thermal output power ($P_{GT}$).

8. The method as claimed in claim 7, wherein the lower heating value (LHV) of the fuel in the equation is adjusted from time to time.

9. The method as claimed in claim 1, wherein the effective thermal output power ($P_{GT}$) of the gas turbine (10) is continuously measured, in that the measured or calculated value of the effective thermal output power ($P_{GT}$) is selectively used for controlling the gas turbine (10), and in that the controlling of the gas turbine (10) is automatically changed over from one to the other value depending upon the state of the gas turbine (10) and of the power supply network.

10. The method as claimed in claim 9, wherein the measured value of the effective thermal output power ($P_{GT}$) is used for controlling the gas turbine if the gas turbine (10) is in a steady operating state, and in that the calculated value of the effective thermal output power ($P_{GT}$) is used if the gas turbine (10) is in a fast changing transition state and/or the power supply network is unstable.

11. The method of claim 1, wherein the gas turbine comprises a compressor unit which comprises at least one compressor, a first combustion chamber which acts downstream of the compressor unit, a first turbine which acts downstream of the first combustion chamber, a second combustion chamber which acts downstream of the first turbine, and a second turbine which acts downstream of the second combustion chamber, wherein the first and the second combustion chamber have an annular configuration, and wherein the second combustion chamber is formed as a self-igniting combustion chamber.

12. The gas turbine as claimed in claim 11, wherein the second combustion chamber is equipped with swirl-generating elements.

13. A gas turbine (10) comprising a compressor (11) for compressing combustion air which is drawn in from the environment, a combustion chamber (15) for combusting supplied fuel by the compressed combustion air, a turbine (12) which is driven by the hot gas from the combustion chamber (15), and a generator (13), which is driven by the turbine (12), for generating electric power which is preferably fed to a local isolated power supply network, wherein a control unit (17) is provided for controlling the operation of the gas turbine (10), and at associated points of the gas turbine (10) transducers (23, ..., 33) are provided for measuring at least one of the following parameters:
an ambient temperature ($T_1$),
a compressor inlet temperature ($T_2$),
a compressor outlet temperature
a turbine exhaust temperature
an ambient air pressure
a total or static absolute or gauge pressure ($p_3$) at a compressor outlet (19),
a total or static absolute or gauge pressure at a turbine inlet (21),
a pressure loss between compressor outlet (19) and turbine inlet (21),
a speed ($n_{GT}$) of the gas turbine (10) or a frequency of the power supply network,
a measured or predetermined mass flow ($m_{fuel}$) of the fuel which is fed to the combustion chamber (15), and
a lower heating value (LHV) of the fuel,
the transducers are connected to the control unit (17), and the control unit (17) is configured to calculate the effective thermal output power ($P_{GT}$) of the gas turbine (10) from the data which is generated by the transducers (23, ..., 33), wherein the effective thermal output power ($P_{GT}$) of the gas turbine (10) is calculated in accordance with the equation $$P_{GT} \propto f1(p_3) \cdot f2(m_{fuel}) \cdot f3(LHV) \cdot f4(n_{GT}) \cdot f5(T_2)$$

where $f1, \ldots, f5$ are functions which are to be determined for a respective case, $p_3$ is the compressor outlet pressure, $m_{fuel}$ is the fuel mass flow, LHV is the lower heating value of the fuel, $n_G T$ is the speed of the gas turbine (10), and $T_2$ is the compressor inlet temperature.

14. The gas turbine as claimed in claim 13, wherein the compressor (11) comprises variable inlet guide vanes (VIGV), a transducer (23), which is connected to the control unit (17), is arranged on the compressor (11) for sensing the position of the variable inlet guide vanes (VIGV).

15. The gas turbine as claimed in claim 13, wherein devices (34) for cooling the gas turbine (10) by the use of a cooling medium are provided on the gas turbine (10), a transducer (31), which is connected to the control unit, is arranged on the gas turbine (10) for measuring the mass flow of the cooling medium.

16. The gas turbine as claimed in claim 13, wherein transducers (33) for measuring the power which is delivered at the generator terminals, the transducers (33), which are connected to the control unit (17), are attached on the terminals of the generator (13).

17. A method for operating a gas turbine (10), which feeds power to a local isolated power supply network, and which comprises a compressor (11) for compressing combustion air which is drawn in from the environment, a combustion chamber (15) for combusting supplied fuel using the compressed combustion air, a turbine (12) which is driven by hot gas from the combustion chamber (15), and a generator (13), which is driven by the turbine (12), for generating electric power, the method comprising:
providing at least one transducer (23, ..., 33) for measuring or determining at least one of the following parameters of the gas turbine:
an ambient temperature ($T_1$),
a compressor inlet temperature ($T_2$),
a compressor outlet temperature
a turbine exhaust temperature
an ambient air pressure
a total or static absolute or gauge pressure (pa) at a compressor outlet (19),
a total or static absolute or gauge pressure at a turbine inlet (21),
a pressure loss between compressor outlet (19) and turbine inlet (21),
a speed ($n_{GT}$) of the gas turbine (10) or a frequency of a power supply network,
a measured or predetermined mass flow ($m_{fuel}$) of the fuel which is fed to the combustion chamber (15), and
a lower heating value (LHV) of the fuel;
calculating an effective thermal output power ($P_{GT}$) of the gas turbine (10) from the measured or determined parameters in accordance with the equation:

$$P_{GT} \propto f1(p_3) \cdot f2(m_{fuel})$$

wherein f1, and f2 are functions which are to be determined for a respective case, $p_3$ is the compressor outlet pressure, $m_{fuel}$ is the fuel mass flow, and;
controlling the gas turbine (10) based on the calculated effective thermal output power ($P_{GT}$).

* * * * *